United States Patent
Sohn

(10) Patent No.: US 6,842,202 B2
(45) Date of Patent: Jan. 11, 2005

(54) ARRAY SUBSTRATE HAVING POLYSILICON TFT FOR LIQUID CRYSTAL DISPLAY DEVICE AND METHOD OF MANUFACTURING THE SAME

(75) Inventor: Choong-Yong Sohn, Choongcheongbuk-do (KR)

(73) Assignee: L.G. Philips LCD, Co., Ltd., Seoul (KR)

( * ) Notice: Subject to any disclaimer, the term of this patent is extended or adjusted under 35 U.S.C. 154(b) by 47 days.

(21) Appl. No.: 10/446,190

(22) Filed: May 28, 2003

(65) Prior Publication Data

US 2004/0075781 A1 Apr. 22, 2004

(30) Foreign Application Priority Data

Oct. 16, 2002 (KR) ................................ 10-2002-0063102

(51) Int. Cl.[7] .............................................. G02F 1/136
(52) U.S. Cl. ....................................................... 349/43
(58) Field of Search ............................. 349/43; 257/59, 257/72

(56) References Cited

U.S. PATENT DOCUMENTS

| | | | | | |
|---|---|---|---|---|---|
| 5,856,854 A | * | 1/1999 | Hyun | ........................ | 349/43 |
| 6,671,022 B1 | * | 12/2003 | Lee et al. | ................... | 349/141 |
| 2002/0113916 A1 | * | 8/2002 | Hashiguchi et al. | .......... | 349/43 |
| 2002/0158995 A1 | * | 10/2002 | Hwang et al. | ................ | 349/43 |

* cited by examiner

Primary Examiner—James A. Dudek
(74) Attorney, Agent, or Firm—Morgan Lewis & Bockius LLP

(57) ABSTRACT

An array substrate for a liquid crystal display (LCD) device includes a plurality of gate lines extending along a first direction on a first substrate, a plurality of data lines extending along a second direction on the first substrate, the gate and data lines defining a pixel region by crossing each other, a thin film transistor formed at a portion adjacent to a cross point of the gate and data lines, the thin film transistor having a gate electrode, an active layer, a source electrode extending from the data line, and a drain electrode spaced apart from the source electrode, the source and drain electrodes contacting the active layer via source and drain contact holes, wherein a first portion of the active layer corresponding to the source electrode has an area wider than other portions of the active layer corresponding to the gate electrode and the drain electrode to include areas of the source electrode and the source contact hole, and a pixel electrode in the pixel region, the pixel electrode being electrically connected to the drain electrode.

20 Claims, 7 Drawing Sheets

ARRAY SUBSTRATE HAVING POLYSILICON TFT FOR LIQUID CRYSTAL DISPLAY DEVICE AND METHOD OF MANUFACTURING THE SAME

This application claims the benefit of Korean Patent Application No. 2002-63102, filed on Oct. 16, 2002 in Korea, which is hereby incorporated by reference as if fully set forth herein.

BACKGROUND OF THE INVENTION

1. Field of the Invention

The present invention relates to a liquid crystal display (LCD) device and more particularly, to an array substrate having polycrystalline silicon thin film transistors for a liquid crystal display (LCD) device.

2. Discussion of the Related Art

Generally, a liquid crystal display (LCD) device utilizes optical anisotropy and polarization properties of liquid crystal molecules to display images. Since the liquid crystal molecules have long and thin structures, alignment orientation of the liquid crystal molecules may be changed by application of an electric field. Accordingly, once the alignment of the liquid crystal molecules is changed, light is refracted according to the alignment of the liquid crystal molecules to display images. The liquid crystal display (LCD) device usually includes an upper substrate, which is commonly referred to as a color filter substrate, having a common electrode, a lower substrate, which is commonly referred to as an array substrate, having a pixel electrode, and a liquid crystal layer interposed between the upper and lower substrates. Accordingly, the liquid crystal display (LCD) device drives the liquid crystal layer by application of an electric field that is formed between the common electrode and the pixel electrode. Currently, an active matrix liquid crystal display (LCD) device (AM-LCD) that includes a plurality of thin film transistors and pixel electrodes arranged in a matrix form has been developed because of its high resolution and ability to display moving images.

FIG. 1 is a perspective view of a liquid crystal display (LCD) device according to the related art. In FIG. 1, a liquid crystal display panel 11 includes a first substrate 5, a second substrate 10, and a liquid crystal layer 14 interposed therebetween. A color filter 8, a black matrix 6, and sub-color filters red (R), a green (G), and a blue (B) are formed on the first substrate 5, and a common electrode 9 is formed on the color filter 8. A plurality of gate lines 15 and a plurality of data lines 26 are formed on the second substrate 10, and a plurality of pixel regions "P" is defined on the second substrate 10 by crossings of the gate and data lines 15 and 26. A thin film transistor "T" is formed at a portion adjacent to the crossings of the gate and data lines 15 and 26, and is connected to the pixel electrode 32. Accordingly, the liquid crystal display (LCD) device controls an amount of transmitted light according to the alignment of the liquid crystal molecules by forming an electric field between the common and pixel electrodes 9 and 32. The thin film transistor "T" includes an active layer (not shown), wherein amorphous silicon or polycrystalline silicon is used for an active layer material. Since a polycrystalline silicon thin film transistor has a faster carrier mobility than an amorphous silicon thin film transistor, the polycrystalline silicon thin film transistor is appropriate for a large-sized liquid crystal display panel.

FIG. 2 is a plan view of an array substrate having a plurality of polycrystalline thin film transistors according to the related art, and FIG. 3 is an expanded plan view of portion "A" in FIG. 2 according to the related art. In FIG. 2, a gate line 52 is formed on a transparent substrate 50 along a first direction, and a data line 54 is formed on the substrate 50 along a second direction. Crossings of the gate and data lines 52 and 54 define a pixel region "P," wherein a thin film transistor "T" is formed at a portion adjacent to a crossing of the gate and data lines 52 and 54 and a pixel electrode 56 connected thereto is formed in the pixel region "Pn." The thin film transistor "T" uses polycrystalline silicon as an active layer material and has a dual gate structure. Moreover, a projected portion of the gate line 52 and a portion of the gate line 52 function as first and second gate electrodes 58a and 58b, respectively. A polycrystalline silicon layer 59 overlaps portions with the gate line 52 and each of the overlapped portions function as first and second active channels CH1 and CH2, respectively. The thin film transistor having the dual gate structure can decrease an OFF current by increasing the number of overlapped areas in a spaced region between source and drain electrodes 64 and 66, thereby decreasing a strength of an electric field formed in the overlapped area. The source and drain electrodes 62 and 64 contact the polycrystalline silicon layer 59 through source and drain contact holes 60 and 62, respectively. The source electrode 60 extends from the data line 54, and the drain electrode 66 is electrically connected to the pixel electrode 56 in the pixel region "P." The pixel electrode 56 in the $(n-1)^{th}$ pixel region "$P_{n-1}$" is connected to the drain electrode 66 in the $n^{th}$ pixel region "$P_n$".

In FIG. 3, portions of the polycrystalline silicon layer 59 for contacting the source and drain electrodes 64 and 66 have wider areas than the first and second active channels CH1 and CH2. Moreover, a width of the polycrystalline silicon layer 59 is abruptly reduced in a region "D" between the first active channel CH1 and the polycrystalline silicon layer portion for contacting the source electrode 64. However, a portion "E" of the polycrystalline silicon layer 59 under the source contact hole 60 may be deleted during manufacturing processes for the array substrate, thereby resulting in an inferiority of the polycrystalline silicon layer 59. Accordingly, although a signal is applied to the source electrode 64, the thin film transistor "T" does not respond to the signal, thus creating a point defect of the liquid crystal display (LCD) device.

SUMMARY OF THE INVENTION

Accordingly, the present invention is directed to an array substrate for a liquid crystal display (LCD) device that substantially obviates one or more of problems due to limitations and disadvantages of the related art.

An object of the present invention is to provide an array substrate for a liquid crystal display (LCD) device having a polycrystalline silicon active layer that prevents loss of the active layer.

Another object of the present invention is to provide a manufacturing method of an array substrate for a liquid crystal display (LCD) device having a polycrystalline silicon active layer that prevents loss of the active layer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display (LCD) device includes a plurality of gate lines extending along a first direction on a first substrate, a plurality of data lines extending along a second direction on the first substrate, the gate and data lines defining a pixel region by crossing each other, a thin film transistor formed at a portion adjacent to a cross point of the gate and data lines, the thin film transistor having a gate electrode, an active layer, a source electrode extending from the data line, and a drain electrode spaced apart from the source electrode, the source and drain electrodes contacting the active layer via source and drain contact holes, wherein a first portion of the active layer corresponding to the source electrode has an area wider than other portions of the active layer corresponding to the gate electrode and the drain electrode to include areas of the source electrode and the source contact hole, and a pixel electrode in the pixel region, the pixel electrode being electrically connected to the drain electrode.

In another aspect, a method for manufacturing an array substrate for a liquid crystal display (LCD) device includes forming a plurality of gate lines extending along a first direction on a first substrate, forming a plurality of data lines extending along a second direction on the first substrate, the gate and data lines defining a pixel region by crossing each other, forming a thin film transistor formed at a portion adjacent to a cross point of the gate and data lines, the thin film transistor having a gate electrode, an active layer, a source electrode extending from the data line, and a drain electrode spaced apart from the source electrode, the source and drain electrodes contacting the active layer via source and drain contact holes, wherein a first portion of the active layer corresponding to the source electrode has an area wider than other portions of the active layer corresponding to the gate electrode and the drain electrode to include areas of the source electrode and the source contact hole, and forming a pixel electrode in the pixel region, the pixel electrode being electrically connected to the drain electrode.

In another aspect, a method for manufacturing an array substrate for a liquid crystal display (LCD) device includes forming an active layer on a substrate, forming a gate insulating layer on the active layer and on the substrate, forming a gate electrode and a gate line on the gate insulating layer, the gate electrode disposed over the active layer, forming an insulating layer on an entire surface of the substrate on which the gate electrode and the gate line are formed, forming a source contact hole and a first drain contact hole by etching the gate insulating layer and the insulating layer, forming a data line and source and drain electrodes spaced apart from each other, the source and drain electrodes contacting the active layer respectively via the source contact hole and the first drain contact hole, forming a passivation layer having a second drain contact hole on the entire surface of the substrate on which the source and drain electrodes are formed, and forming a pixel electrode in the pixel region, the pixel electrode being electrically connected to the drain electrode via the second drain contact hole, wherein a first portion of the active layer corresponding to the source electrode has an area wider than other portions of the active layer corresponding to the gate electrode and the drain electrode to include areas of the source electrode and the source contact hole.

In another aspect, an array substrate for a liquid crystal display (LCD) device includes a plurality of gate lines extending along a first direction on a first substrate, a plurality of data lines extending along a second direction on the first substrate, the gate and data lines defining a pixel region by crossing each other, a thin film transistor formed at a portion adjacent to a cross point of the gate and data lines, the thin film transistor having first and second gate electrodes, an active layer, a source electrode, and a drain electrode, wherein a first portion of the active layer corresponding to the source electrode is pentagon-shaped having an apex positioned along the second direction; and a pixel electrode in the pixel region, the pixel electrode being electrically connected to the drain electrode.

In another aspect, an array substrate for a liquid crystal display (LCD) device includes a plurality of gate lines extending along a first direction on a first substrate, a plurality of data lines extending along a second direction on the first substrate, the gate and data lines defining a pixel region by crossing each other, a thin film transistor formed at a portion adjacent to a cross point of the gate and data lines, the thin film transistor having first and second gate electrodes, an active layer, a source electrode, and a drain electrode, wherein a first portion of the active layer corresponding to the source electrode is triangular-shaped with an apex positioned along the second direction, and a pixel electrode in the pixel region, the pixel electrode being electrically connected to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiment of the present invention, which is illustrated in the accompanying drawings.

Figure 1:
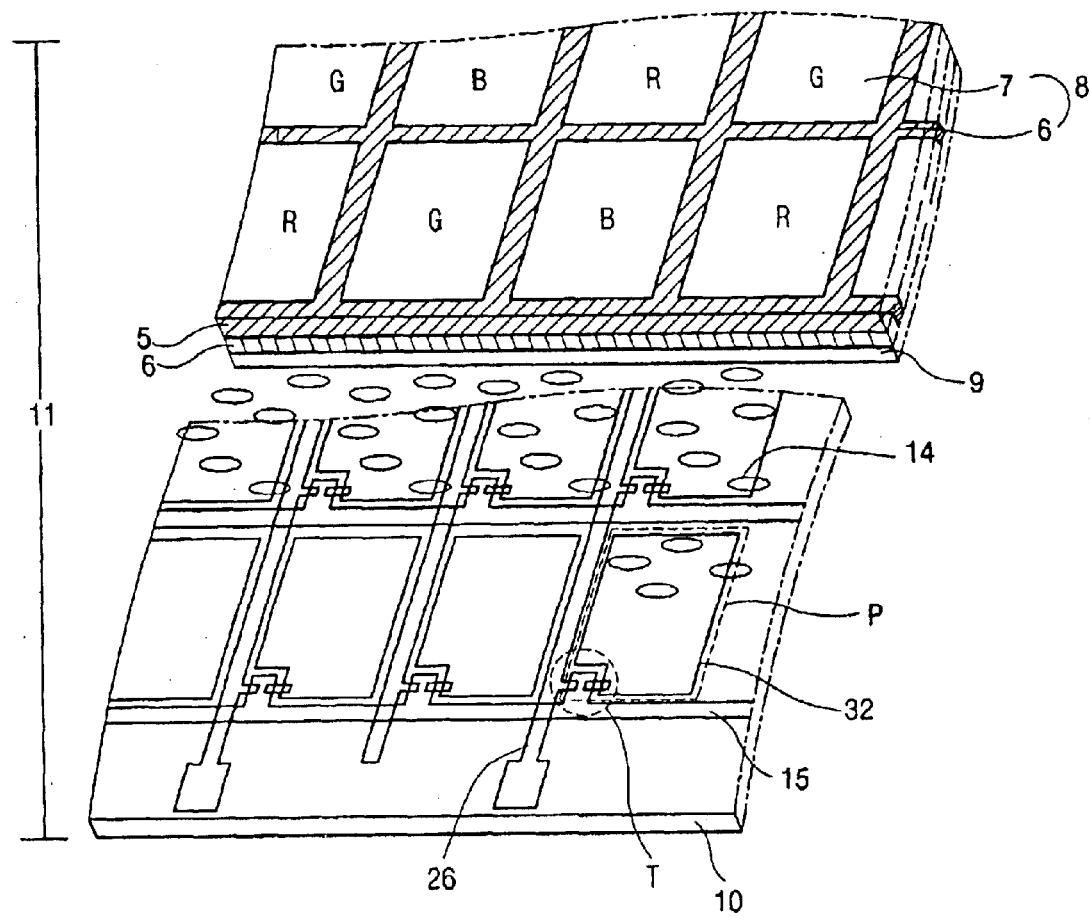
FIG. 1 is a perspective view of a liquid crystal display (LCD) device according to the related art.
Figure 2:
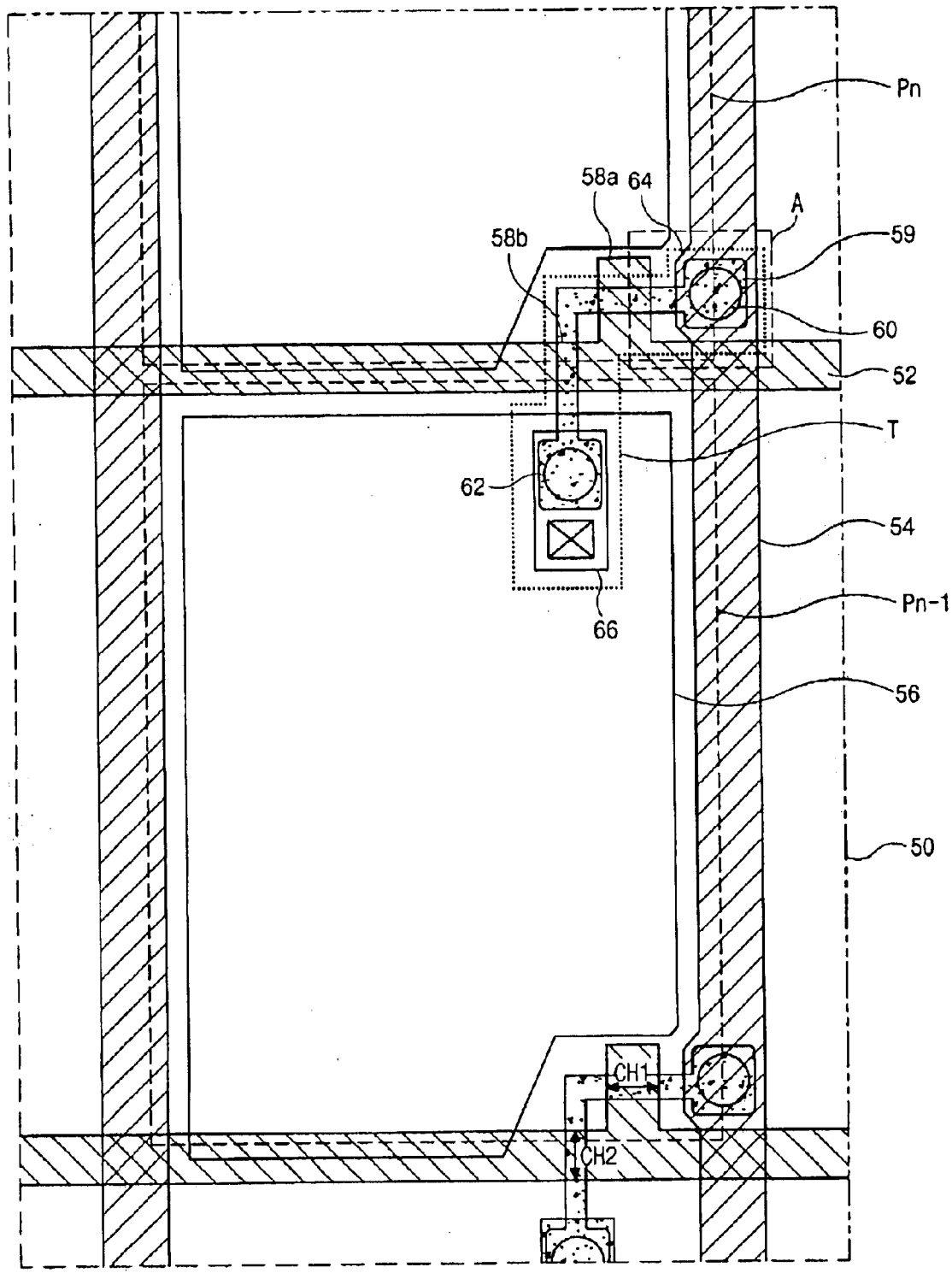
FIG. 2 is a plan view of an array substrate having a plurality of polycrystalline thin film transistors according to the related art.
Figure 3:
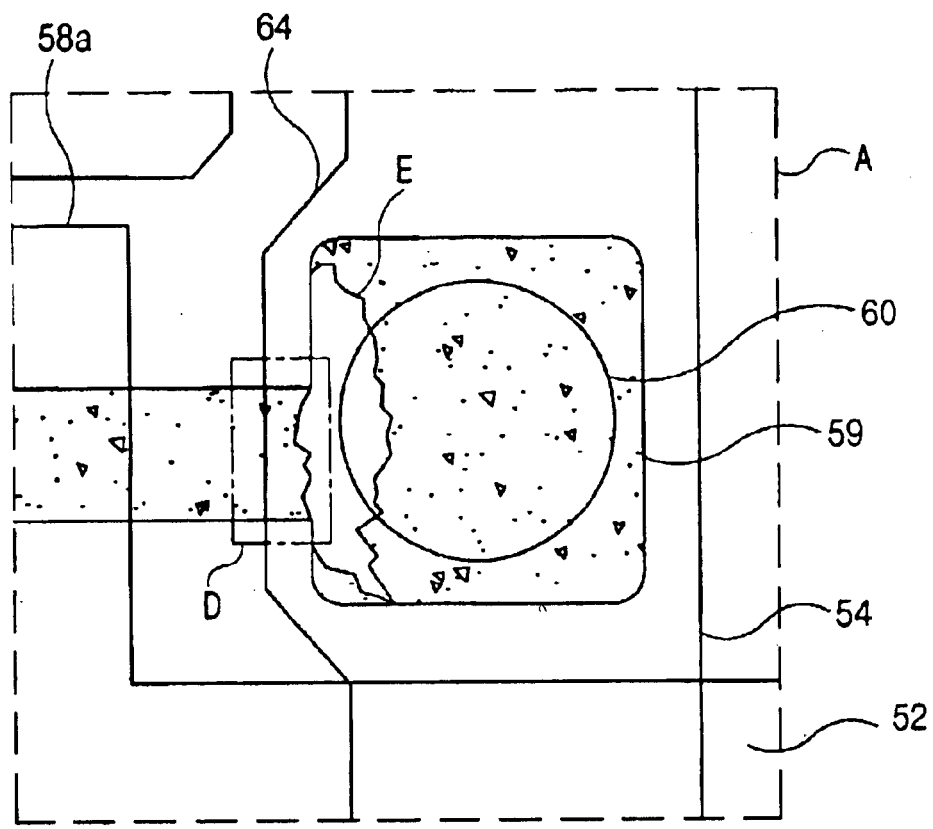
FIG. 3 is an expanded plan view of portion "A" in FIG. 2 according to the related art.
Figure 4:
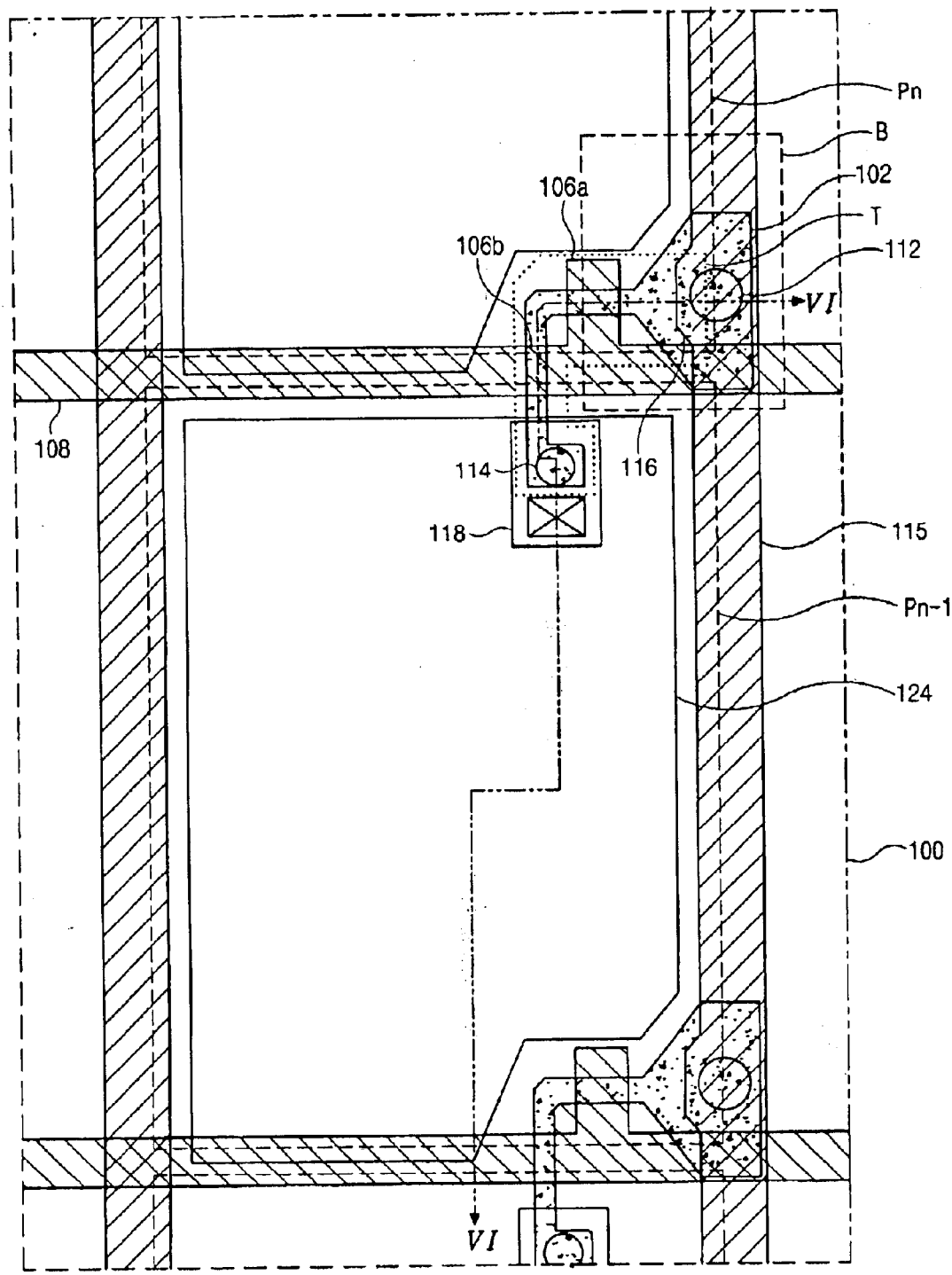
FIG. 4 is a plan view of an exemplary array substrate having a plurality of polycrystalline thin film transistors for a liquid crystal display (LCD) device according to the present invention.
Figure 5:
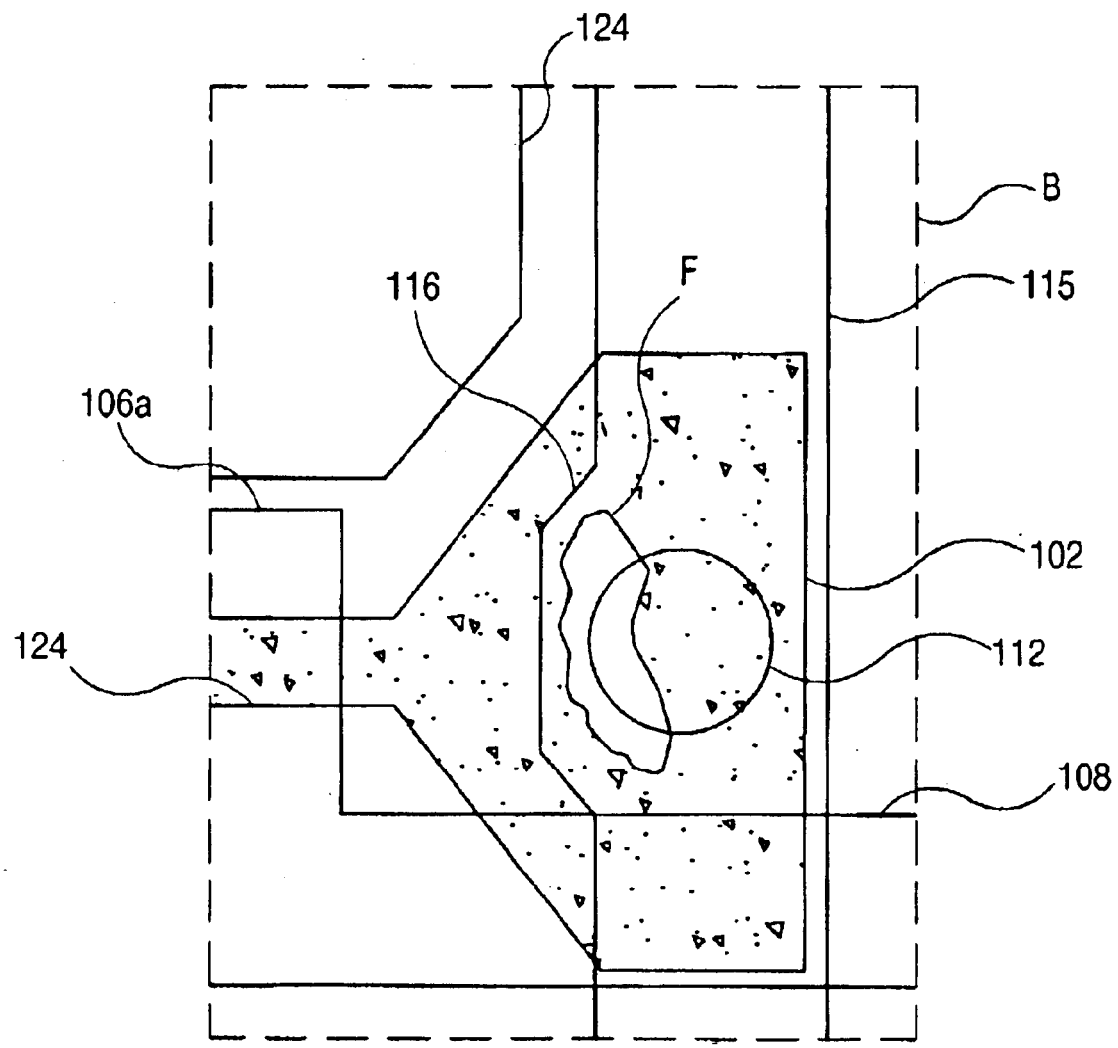
FIG. 5 is an expanded view of the exemplary portion "B" of FIG. 4.

FIG. 4 is a plan view of an exemplary array substrate having a plurality of polycrystalline thin film transistors for a liquid crystal display (LCD) device according to the present invention, and FIG. 5 is an expanded view of the exemplary portion "B" of FIG. 4. In FIG. 4, a plurality of gate lines 108 may be formed on a substrate 100 along a first direction, and a plurality of data lines 115 may be formed on the substrate 100 along a second direction perpendicular to the first direction. Crossings of the gate and data lines 108 and 115 may define a pixel region "Pn." A polycrystalline silicon thin film transistor "T" having a dual gate structure, for example, may be formed at a portion adjacent to the crossings of the gate and data lines 108 and 115. The polycrystalline silicon thin film transistor "T" may include an active layer 102 formed of polycrystalline silicon, first and second gate electrodes 106a and 106b disposed over the active layer 102, a source electrode 116, and a drain electrode 118.

For example, the pixel electrode 124 in the $(n-1)^{th}$ pixel region "$P_{n-1}$" may be connected to the drain electrode 118 of the thin film transistor "T" in the $n^{th}$ pixel region "$P_n$". The active layer 102 may be formed under the first and second gate electrodes 106a and 106b, and both ends of the active layer 102 may be electrically connected to the source and drain electrodes 116 and 118 via a source contact hole 112 and a first drain contact hole 114, respectively. The first gate electrode 106a may extend from the gate line 108, and the second gate electrode 106b may be formed from a portion of the gate line 108. Accordingly, a portion of the active layer 102 may correspond to the source electrode 116, and the data line 115 adjacent to the source electrode 116 may have a pentagon shape to cover the source electrode 116 and a portion of the data line 115 adjacent to the source electrode 116. Thus, a portion of the active layer 102 corresponding to the source electrode 116 may have an area larger than portions of the active layer 102 corresponding to the first and second gate electrodes 106a and 106b. Alternatively, the portion of the active layer 102 may include a triangular shape instead of a pentagon shape. Accordingly, a signal transmitted along the data line 115 may be supplied to the thin film transistor "T" even when a portion "F" of the active layer 102 corresponding to the source electrode 116 deleted during manufacturing processes of the array substrate. Thus, the portion of the active layer 102 corresponding to the source electrode 116 has an area large enough to cover the deleted portion of the active layer 102.

Figure 6A:
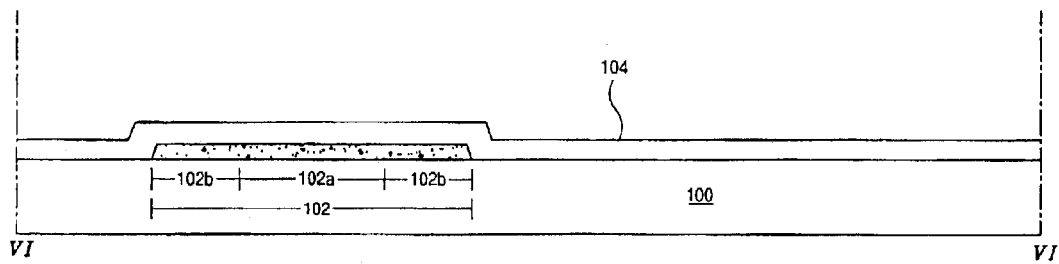
FIGS. 6A to 6D are cross-sectional views along "VI—VI" of FIG. 4 showing an exemplary fabrication sequence of an array substrate according to the present invention.

FIGS. 6A to 6D are cross-sectional views along "VI—VI" of FIG. 4 showing an exemplary fabrication sequence of an array substrate according to the present invention. In FIG. 6A, a polycrystalline silicon layer 102 may be formed on a transparent insulating substrate 100, wherein the polycrystalline silicon layer 102 may include first and second active regions 102a and 102b. The first active region 102 may function as a channel, and the second active region 102b may function as an ohmic contact region. The second active region 102b corresponding to a source electrode 116 that will be formed later may have a shape of a pentagon or a triangle to cover the source electrode 116 and a portion of a data line 115 (in FIG. 5) adjacent to the source electrode 116 (in FIG. 5). The polycrystalline silicon active layer 102 may be formed by forming an amorphous silicon layer on an entire surface of the transparent insulating substrate 100, heating the amorphous silicon layer to crystallize the silicon, and patterning the crystallized silicon layer with a photolithographic process, for example. The patterned polycrystalline silicon active layer 102 may have an "L" shape, as shown in FIG. 4. Then, a gate insulating layer 104 may be formed by depositing an inorganic insulating material, such as silicon oxide ($SiO_2$) and silicon nitride (SiNx), on the entire surface of the transparent insulating substrate 100 on which the polycrystalline silicon active layer 102 is already formed.

Figure 6B:
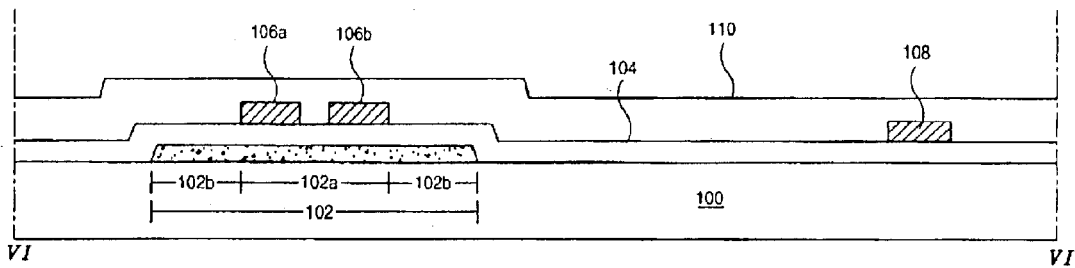

In FIG. 6B, a gate line 108 and a projected portion of the gate line 108 (in FIG. 4) may be formed by depositing a conductive metal material, such as aluminum (Al), aluminum alloys, chromium (Cr), and molybdenum (Mo), on the gate insulating layer 104, and then patterning the conductive metal material. A portion of the gate line 108 may function as a first gate electrode 106a, and the projected portion of the gate line 108 may function as a second gate electrode 106b. The first and second gate electrodes 106a and 106b may overlap with a portion of the first active region 102a of the polycrystalline silicon active layer 102. An insulating layer 110 may be formed by depositing an inorganic insulating material, such as silicon nitride (SiNx) and silicon oxide ($SiO_2$), on the entire surface of the transparent insulating substrate 100 upon which the gate line 108 is already formed.

Figure 6C:
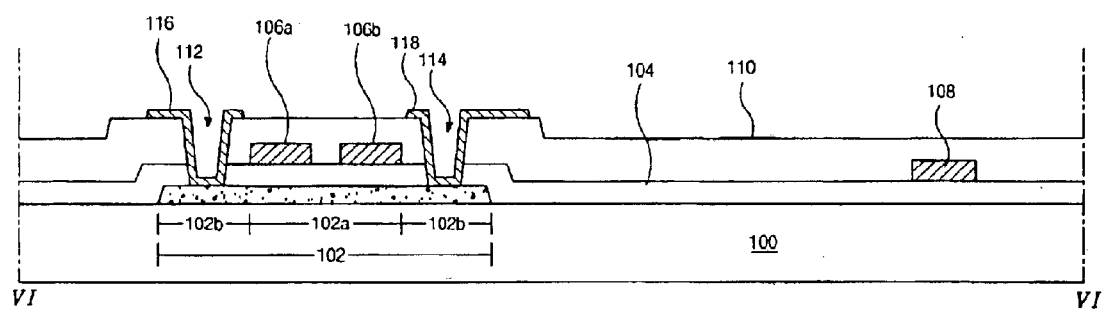

In FIG. 6C, a source contact hole 112 and a first drain contact hole 114 that expose portions of the second active regions 102b may be formed by etching the insulating layer 110 and the gate insulating layer 104. Subsequently, the data line 115 (in FIG. 4), a source electrode 116, and a drain electrode 118 may be formed by depositing a conductive metal material, such as chromium (Cr), tantalum (Ta), molybdenum (Mo), titanium (Ti), and copper (Cu), on the entire surface of the transparent insulating substrate 100, and then patterning the conductive metal material. The source electrode 116 may extend from the data line 115 and may contact a portion of one of the second active region 102b via the source contact hole 112. The drain electrode 118 may be spaced apart from the source electrode 116 and may contact a portion of the other second active region 102b via the first drain contact hole 114. The source electrode 116 may have an overall area smaller than a corresponding area of the second active region 102b. Accordingly, the second active region 102b corresponding to the source electrode 116 has an area wider than the source electrode 116, and the second active region 102b may have a shape of a pentagon or a triangle, as shown in FIG. 5. Thus, the second active region 102b may be formed larger than the source electrode 116 and the source contact hole 112. Accordingly, even if there exists a deleted portion of the active layer 102 around the source contact hole 112 during manufacturing processes, the portion of the active layer 102 corresponding to the source electrode 116 is not electrically severed from a portion of the active layer 102 corresponding to the drain electrode 118. Therefore, a signal transmitted along the data line 115 may be supplied to the drain electrode 118 via the active layer 102.

Figure 6D:
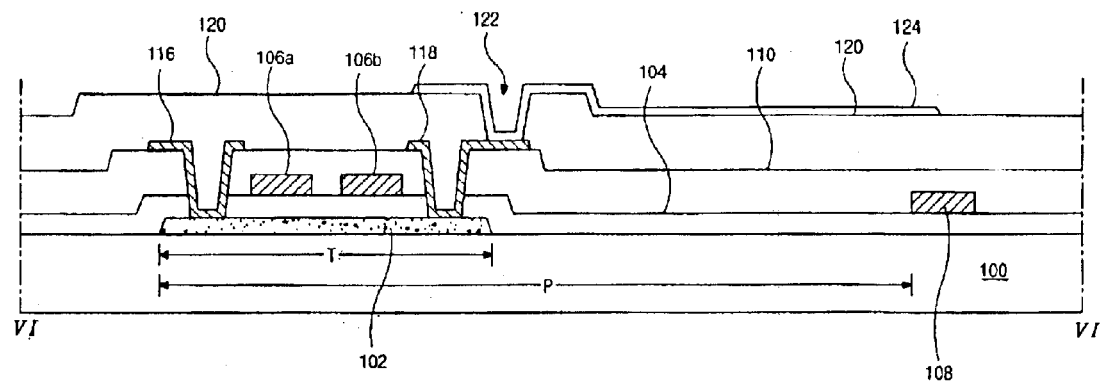

In FIG. 6D, a passivation layer 120 may be formed by depositing one of an inorganic insulating material, such as silicon nitride (SiNx) and silicon oxide ($SiO_2$), or an organic insulating material, such as benzocyclobutene (BCB) and an acrylic resin, on the entire surface of the transparent insulating substrate 100 upon which the source and drain electrodes 116 and 118 are already formed. Subsequently, a second drain contact hole 122 exposing a portion of the drain electrode 118 may be formed by etching the passivation layer 120. A pixel electrode 124 may be formed in the pixel region "P" by depositing a transparent conductive material, such as indium tin oxide (ITO) and indium zinc oxide (IZO), on the entire surface of the transparent insulating substrate 100, and then patterning the transparent conductive material. Accordingly, the pixel electrode 124 may be electrically connected to the drain electrode 118 via the second drain contact hole 122.

It will be apparent to those skilled in the art that various modifications and variation can be made in the array substrate having a polysilicon TFT for a liquid crystal display device and a method for manufacturing the same of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display (LCD) device, comprising:
   a plurality of gate lines extending along a first direction on a first substrate;
   a plurality of data lines extending along a second direction on the first substrate, the gate and data lines defining a pixel region by crossing each other;
   a thin film transistor formed at a portion adjacent to a cross point of the gate and data lines, the thin film transistor having a gate electrode, an active layer, a source electrode extending from the data line, and a drain electrode spaced apart from the source electrode, the source and drain electrodes contacting the active layer via source and drain contact holes, wherein a first portion of the active layer corresponding to the source electrode has an area wider than other portions of the active layer corresponding to the gate electrode and the drain electrode to include areas of the source electrode and the source contact hole; and
   a pixel electrode in the pixel region, the pixel electrode being electrically connected to the drain electrode.

2. The array substrate according to claim 1, wherein the gate electrode includes a first gate portion that projects from the gate line and extends along the second direction, and a second gate portion that extends along the first direction.

3. The array substrate according to claim 1, wherein the active layer includes polycrystalline silicon.

4. The array substrate according to claim 3, wherein the active layer is L-shaped.

5. The array substrate according to claim 3, wherein the first portion of the active layer corresponding to the source electrode is pentagon-shaped having an apex positioned toward the gate electrode along the first direction.

6. The array substrate according to claim 3, wherein the first portion of the active layer corresponding to the source electrode is triangular-shaped having an apex positioned toward the gate electrode along the first direction.

7. A method for manufacturing an array substrate for a liquid crystal display (LCD) device, comprising:
   forming a plurality of gate lines extending along a first direction on a first substrate;
   forming a plurality of data lines extending along a second direction on the first substrate, the gate and data lines defining a pixel region by crossing each other;
   forming a thin film transistor formed at a portion adjacent to a cross point of the gate and data lines, the thin film transistor having a gate electrode, an active layer, a source electrode extending from the data line, and a drain electrode spaced apart from the source electrode, the source and drain electrodes contacting the active layer via source and drain contact holes, wherein a first portion of the active layer corresponding to the source electrode has an area wider than other portions of the active layer corresponding to the gate electrode and the drain electrode to include areas of the source electrode and the source contact hole; and
   forming a pixel electrode in the pixel region, the pixel electrode being electrically connected to the drain electrode.

8. The method according to claim 7, wherein the gate electrode includes a first gate portion that projects from the gate line and extends along the second direction, and a second gate portion that extends along the first direction.

9. The method according to claim 7, wherein the active layer includes polycrystalline silicon.

10. The method according to claim 9, wherein the active layer is L-shaped.

11. The method according to claim 9, wherein the first portion of the active layer corresponding to the source electrode is pentagon-shaped having an apex positioned toward the gate electrode along the first direction.

12. The method according to claim 9, wherein the first portion of the active layer corresponding to the source electrode is triangular-shaped having an apex positioned toward the gate electrode along the first direction.

13. A method for manufacturing an array substrate for a liquid crystal display (LCD) device, comprising:
   forming an active layer on a substrate;
   forming a gate insulating layer on the active layer and on the substrate;
   forming a gate electrode and a gate line on the gate insulating layer, the gate electrode disposed over the active layer;
   forming an insulating layer on an entire surface of the substrate on which the gate electrode and the gate line are formed;
   forming a source contact hole and a first drain contact hole by etching the gate insulating layer and the insulating layer;
   forming a data line and source and drain electrodes spaced apart from each other, the source and drain electrodes contacting the active layer respectively via the source contact hole and the first drain contact hole;
   forming a passivation layer having a second drain contact hole on the entire surface of the substrate on which the source and drain electrodes are formed; and
   forming a pixel electrode in the pixel region, the pixel electrode being electrically connected to the drain electrode via the second drain contact hole,
   wherein a first portion of the active layer corresponding to the source electrode has an area wider than other portions of the active layer corresponding to the gate electrode and the drain electrode to include areas of the source electrode and the source contact hole.

14. The method according to claim 13, wherein the gate electrode includes a first gate portion that projects from the gate line along a first direction, and a second gate portion that extends along a second direction perpendicular to the first direction.

15. The method according to claim 13, wherein the active layer includes polycrystalline silicon.

16. The method according to claim 15, wherein the active layer is L-shaped.

17. The method according to claim 15, wherein the first portion of the active layer corresponding to the source electrode is pentagon-shaped having an apex positioned toward the gate electrode along a direction of the gate line.

18. The method according to claim 15, wherein the first portion of the active layer corresponding to the source electrode is triangular-shaped with an apex positioned toward the gate electrode along a direction of the gate line.

19. An array substrate for a liquid crystal display (LCD) device, comprising:
   a plurality of gate lines extending along a first direction on a first substrate;
   a plurality of data lines extending along a second direction on the first substrate, the gate and data lines defining a pixel region by crossing each other;

a thin film transistor formed at a portion adjacent to a cross point of the gate and data lines, the thin film transistor having first and second gate electrodes, an active layer, a source electrode, and a drain electrode, wherein a first portion of the active layer corresponding to the source electrode is pentagon-shaped having an apex positioned along the second direction; and a pixel electrode in the pixel region, the pixel electrode being electrically connected to the drain electrode.

20. An array substrate for a liquid crystal display (LCD) device, comprising:

a plurality of gate lines extending along a first direction on a first substrate;

a plurality of data lines extending along a second direction on the first substrate, the gate and data lines defining a pixel region by crossing each other;

a thin film transistor formed at a portion adjacent to a cross point of the gate and data lines, the thin film transistor having first and second gate electrodes, an active layer, a source electrode, and a drain electrode, wherein a first portion of the active layer corresponding to the source electrode is triangular-shaped with an apex positioned along the second direction; and a pixel electrode in the pixel region, the pixel electrode being electrically connected to the drain electrode.

* * * * *